C. W. DAKE.
CAR SECTION.
APPLICATION FILED JAN. 29, 1915.

1,197,188.

Patented Sept. 5, 1916.

Witnesses:
Edward T. Wray.
Minnie M. Lindeman

Inventor.
Charles W. Dake,
by Parks & Carty
Attorneys.

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

CAR-SECTION.

1,197,188.          Specification of Letters Patent.      Patented Sept. 5, 1916.

Application filed January 29, 1915. Serial No. 5,004.

*To all whom it may concern:*

Be it known that I, CHARLES W. DAKE, a citizen of the United States, residing at Chicago, in the county of Cook and State of Illinois, have invented a certain new and useful Improvement in Car-Sections, of which the following is a specification.

My invention relates to car sections and has for its object to provide a stiffened insulated metal car end adapted to be secured in any desired manner to any kind of a car whether of metal or wooden frame.

It is illustrated in the accompanying drawings where I have shown the same as applied to the end of a car frame, but since the method of attachment is no part of my present invention, I have not shown any details thereof. Indeed, the drawings are to be taken as in a sense diagrammatic.

Figure 1:
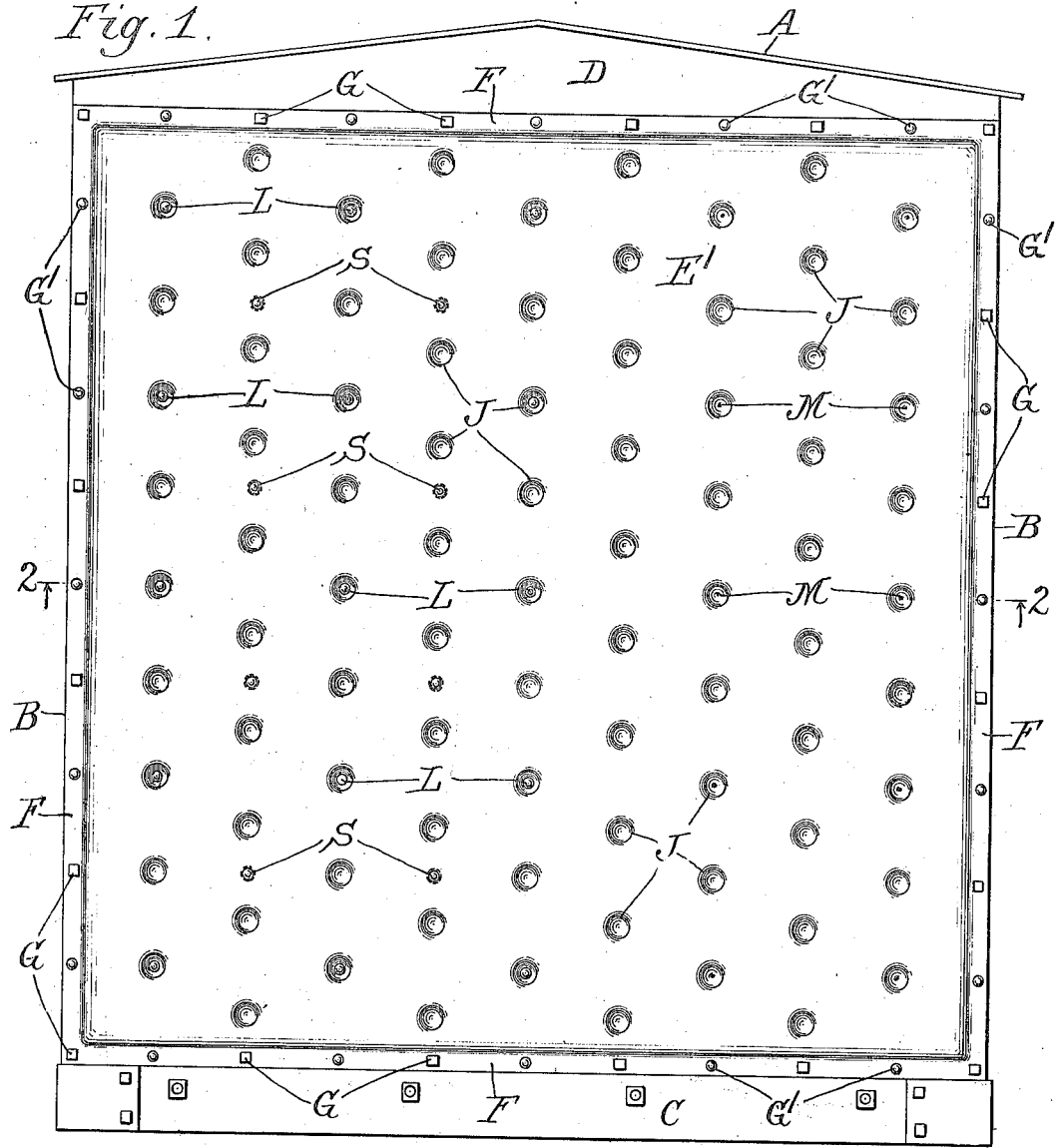
Figure 2:
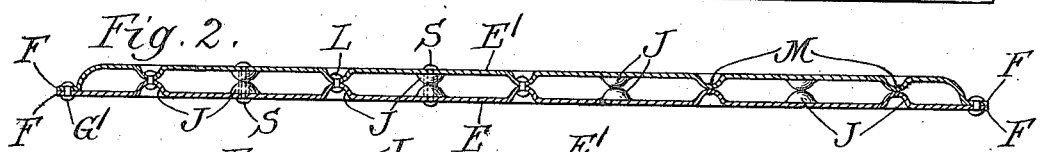
Figure 3:
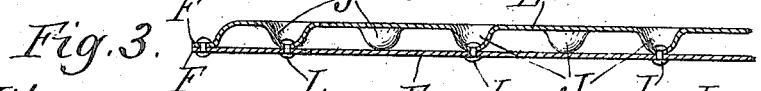

Figure 1 is an elevation of a car showing my car end attached thereto; Fig. 2 is a horizontal section through the same; Fig. 3 is a detail section through a modification.

Like parts are indicated by the same letter in the figures.

A is the roof of the car, B, B the sides thereof, C the end sill and D a plate between the roof of the car and the car end proper.

E, $E^1$ are two plates arranged in parallel but separated planes and terminating in flat contiguous edges F, F so as to form for the entire structure a flat edge suitable for its attachment to the car. The car end may be attached to the frame in any desired manner, as for example by bolts or by rods G, G and these or the rivets $G^1$, $G^1$ should be arranged in such manner as to secure the two plates together at their edges. J, J are a series of nipples, preferably formed on both plates by depressing the surface of the plate, of such depth as to engage each other or extend through to the inner surface of the opposite plate. Thus I provide between the two plates a series of spacers integral with one or both of the plates. The plates may be secured together in any desired manner and at any desired point, as for example by bolts S, S through the plates, or by bolts L, L through the nipples, or preferably by some form of welding or some heat process as at M.

The preferred form is the structure shown wherein one plate is flat, the other provided with a bent rim and the two plates are welded at the point where the opposed nipples engage each other and are riveted together at their outer edges.

I do not, of course, desire to be limited to the particular size, proportion, arrangement and structure of the several parts and wish my drawings to be taken as in a sense diagrammatic. Doubtless great changes could be made in these particulars without departing from the spirit of my invention.

The use and operation of my invention are as follows: The two plates formed as here indicated may be exact duplicates of each other so that in making the plates a number of exactly similar plates may be stocked and any two of them may be assembled to make a particular car end, or the plates may differ in the particular that one has a dished rim. The car section when formed of two such plates presents an outer flat edge whereby it may be attached to the car. Of course, such flat edge is not indispensable and it may take any form or shape desired. The spacers separate the two plates and when they are secured at their edges the truss effect is obtained. The plates may be secured together at their edges or through the nipples or at any other point by spot welding or otherwise.

A car end like that illustrated is strongly braced against pressure in either direction, is insulated and is easily attached, either side in. Of course, the plates can be secured at their edges only or at some of their other parts only, but in the preferred form a certain number of indentations or nipples would be secured together, preferably by welding, and the edges would be secured together at certain points preferably by bolts. The entire car end structure could be sectional, proper provision being made to attach the parts together.

I have described my invention as a car end. It will be obvious, however, that except for such arrangements as are made for the attachment of the plate or plates to the car end, the sheet metal structure is equally applicable for any other purpose and particularly for the building up of the sides of cars. I wish, therefore, my expression car end, so far as it applies to the sheet metal structure itself, at least to be understood as relating to and covering sheet metal structures of the kind suitable for car ends or for other purposes.

In this case I have spoken throughout of car ends, but the invention is equally applicable to other sections or portions of the car, as, for instance, car doors or sections of the car sides, as the case might be.

I claim:

1. A car end comprising two plates in separated but parallel planes, provided with surrounding flat engaging edges, and with bosses between said plates intermediate said edges which act as spacers between the two plates, and means for securing the two plates together.

2. A car end comprising two plates in separated but parallel planes, provided with surrounding flat engaging edges, and with bosses between said plates intermediate said edges which act as spacers between the two plates, and means for securing the two plates together, said bosses on both plates.

3. A car end comprising two plates in separated but parallel planes, provided with surrounding flat engaging edges, and with bosses between said plates intermediate said edges which act as spacers between the two plates, and means for securing the two plates together, said bosses on both plates and adapted to contact each other.

In testimony whereof, I affix my signature in the presence of two witnesses this 23rd day of January, 1915.

CHARLES W. DAKE.

Witnesses:
BESSIE S. RICE,
MINNIE M. LINDENAU.